Dec. 12, 1967 W. C. HAND 3,357,665
PIPE CLAMPS
Filed Feb. 16, 1966
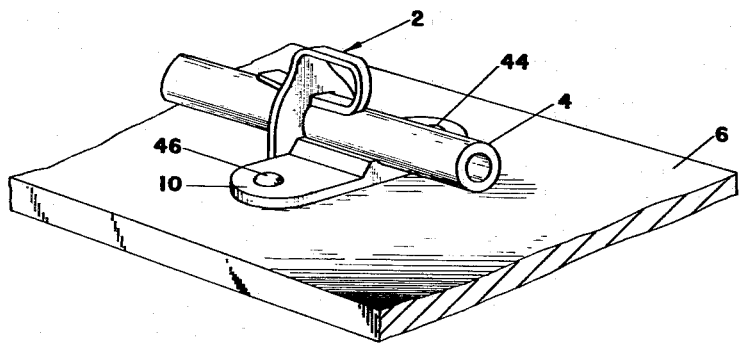
FIG. 1
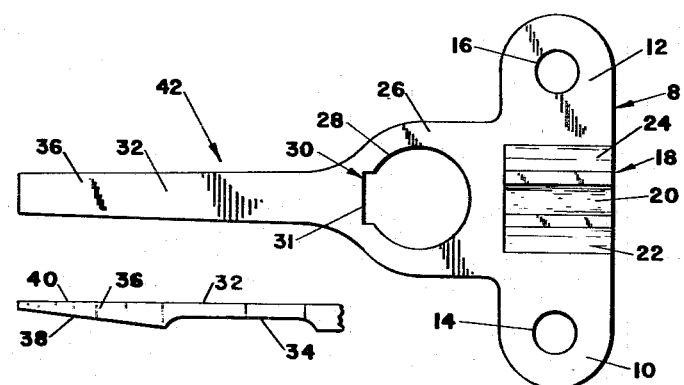
FIG. 4
FIG. 5
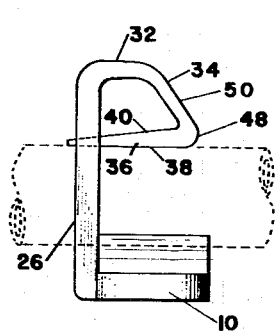
FIG. 2
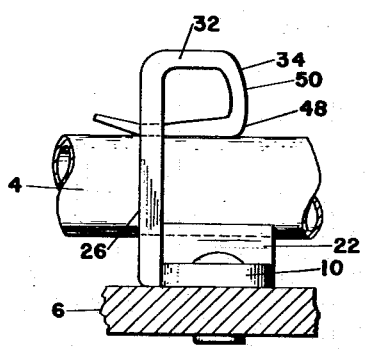
FIG. 6
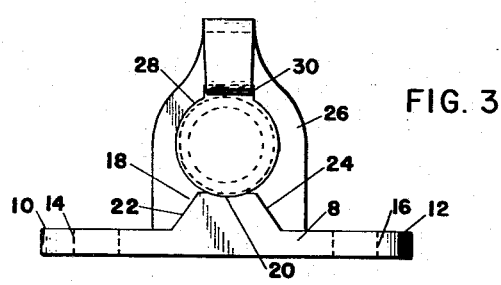
FIG. 3
INVENTOR
WILLIAM C. HAND
BY
ATTORNEY

# United States Patent Office 3,357,665
Patented Dec. 12, 1967

3,357,665
PIPE CLAMPS
William C. Hand, Kansas City, Mo., assignor to Inventions and Invention Consultants, Inc., Chicago, Ill., a corporation of Illinois
Filed Feb. 16, 1966, Ser. No. 527,916
8 Claims. (Cl. 248—74)

ABSTRACT OF THE DISCLOSURE

A pipe clamp having a base with a pipe-supporting cradle on it. A plate-like pipe-receiving portion extends upwardly from the base and is provided with an aperture sized to slidably accommodate the pipe. A tail portion is integrally connected to the pipe-receiving portion, projects laterally therefrom, and turns under itself in the provision of a striking surface and a wedge-shaped end portion. The wedge-shaped end portion extends into a notch which opens into the aperture so that when the striking surface is struck with a blow sufficient in magnitude to deform the tail portion, the wedge-shaped end portion will move through the pipe-receiving portion and cam itself toward the cradle.

---

This invention relates in general to fastening devices and, more particularly, to pipe clamps.

Generally speaking, wherever tubular conduits are used some sort of clamping means must be employed to hold the conduit to a supporting structure. For example, every rail car is provided with a longitudinally extending pipe which terminates at each end of the car where it is provided with flexible hoses having suitable couplings at their free ends. When a number of cars are hooked together in the formation of a train and the couplings of the flexible hoses are fastened together the longitudinally extending pipes and hoses form a "train line" running the length of the train. The train line, of course, carries air under pressure for actuating the air brakes of each rail car. The longitudinally extending pipes are generally held to the underside of the rail cars by means of pipe clamps, each comprising a base which is securely fastened to the car, a cap which engages the base and fits over the pipe, and a bolt for holding the cap and base together with the pipe interposed therebetween. Such clamps are comparatively expensive to manufacture and require manipulation of nuts and bolts in awkward locations for installation. Moreover, rolling stock is often subjected to sustained vibrations which tend to loosen the bolts and nuts and ultimately allow the pipe to slide within or break free of the clamp. Some clamps of current manufacture employ wedges as well as a multitude of other parts, all of which are awkward to manipulate, are easily misplaced, and can work loose. More sophisticated pieces of rolling stock use pipe and tubing for signal lines, steam lines, air conditioning systems, and the like. Tank cars, in particular, often carry heater pipes securely fastened to the interior faces of the tank walls by suitable clamps. Such pipes convey a heated fluid medium which prevents the contents of the car from freezing on cold days.

The present invention resides in an extremely simple clamp having a base and an upstanding center portion provided with an aperture adapted to receive a pipe. The center portion merges into a wedge-shaped tail portion which is bent over and wedged between the margin of the aperture and the walls of the pipe so as to retentively fasten the pipe within the aperture.

Among the several objects of the present invention may be noted the provision of a pipe clamp which is simple and rugged in construction and easy to manufacture; the provision of a pipe clamp which requires a minimum amount of manual skill and effort to bring into clamping engagement with a pipe fitted therein; and the provision of a pipe clamp which requires very little time to install. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated.

FIG. 1 is a perspective view of a pipe clamp constructed in accordance with and embodying the present invention, the clamp being mounted on a supporting structure and being in clamping engagement with a pipe;

FIG. 2 is a side elevational view of the pipe clamp;

FIG. 3 is an end elevational view of the pipe clamp;

FIG. 4 is a top plan view of a blank from which the pipe clamp of FIG. 1 is formed;

FIG. 5 is a fragmentary side elevational view of the tail portion of the blank illustrated in FIG. 4; and FIG. 6 is a side elevational view of the pipe clamp showing a pipe retentively secured by it.

Corresponding reference characters indicate corresponding parts throughout the several views of the drawings.

Referring now in more detail and by reference characters to the drawings, which illustrate a preferred embodiment of the present invention, 2 designates a pipe clamp adapted to retentively engage an elongated tubular member or pipe 4 and hold it rigidly on a supporting structure 6. Pipe clamp 2 can be formed from any suitable somewhat malleable material such as aluminum or drop-forged iron and includes a base 8 having two outwardly projecting ears 10, 12, provided with apertures 14, 16. Integrally formed on base 8 is an upstanding cradle 18 having an outwardly presented somewhat depressed arcuate surface 20 which is contoured to conform to the outer cylindrical surface of pipe 4. Cradle 18 extends transversely across base 8 and terminates in planar end faces 22, 24, located at the side margins thereof.

Base 8 integrally merges into a center or pipe-receiving portion 26 which extends perpendicularly to base 8 along one of its side margins where center portion 26 is in facewise abutment with the planar end face 22 of cradle 18, as best seen in FIGS. 2 and 3. Center portion 26 is further provided with a substantially circular aperture 28, the margin of which conforms to and registers with depressed arcuate surface 20 of cradle 18. Aperture 28 is slightly larger in diameter than the outside diameter of pipe 4 so that pipe 4 can slide freely therein. Projecting outwardly from aperture 28 in diametrally opposed relation to arcuate surface 20 is a notch 30 of somewhat rectangular cross-sectional shape and partially defined by a planar bearing surface 31, all for purposes presently more fully appearing.

Beyond notch 30 center portion 26 integrally merges into a tail portion 32 which is relieved for a portion of its length in the formation of a reduced intermediate section 34 and it outwardly terminates at a wedge-shaped end portion 36 having outwardly tapered opposed wedge-forming surfaces 38, 40. As will be seen by reference to FIG. 2, reduced section 34 is bent around so that the extreme tip of of wedge-shaped end portion 36 is located within notch 30 while wedge-forming surface 38 is located in outwardly spaced substantially parallel relation to the longitudinal centerline of arcuate surface 20 of cradle 18. Moreover, surface 38 is located beyond arcuate surface 20 by a distance substantially equal to the diameter of aperture 28 so as not to interfere with the passage of pipe 4 through aperture 28.

Referring now to FIGS. 4 and 5, pipe clamp 2 can be forged or otherwise formed from a substantially flat blank 42 on which center portion 26 is merely a planar extension of base 8 and tail 32 projects in an unfolded or flat configuration therebeyond. Cradle 18 can be forged integral to base 8 or it can be welded, brazed, riveted or otherwise suitably fastened thereto as a separate piece. To transform blank 42 into clamp 2 it is merely necessary to bend blank 42 along the juncture of center portion 26 and base 8 until the former is brought into facewise abutment with the planar end face 22 of cradle 18. Thereafter, the transversely reduced section 34 of tail 32 is bent in the configuration previously described and illustrated in FIG. 2. Inasmuch as tail 32 must be bent approximately 270° and is further bent during installation, as will presently be described, it is desirable to manufacture clamp 2 from a somewhat malleable material such as drop-forged iron or aluminum.

In use, clamp 2 is securely fastened to supporting structure 6 by means of bolts or rivets 44, 46, which extend through apertures 14, 16, respectively, of base 8. If desired, base 8 can be welded to supporting structure 6 in which case rivets 44, 46, could be dispensed with, but of course, base 8 and supporting structure 6 would have to be compatible metals. Thereafter, pipe 4 is slidably fitted through aperture 28 and located in the proper position. When so located, tail portion 32 is struck sharply with a hammer at point 48, reference being made to FIGS. 2 and 6 so as to drive wedge-shaped end portion 36 into notch 30. It should be noted that point 48 is located along the outwardly projecting portion of reduced intermediate section 34, which portion forms a striking surface 50. As wedge-shaped end portion 36 advances, wedge-forming surface 40 engages bearing surface 31, causing surface 38 to move toward cradle 18 and frictionally engage the cylindrical wall of pipe 4. When wedge-shaped end portion 36 is fully advanced, pipe 4 will be forced snugly against arcuate surface 20 of cradle 18, as illustrated in FIG. 6, and longitudinal as well as rotational movement of pipe 4 will be precluded. Actual experiments have demonstrated that clamp 2 will hold pipe 4 securely over extended periods of time, but as an added precaution it is desirable to pry the end of end portion 36 projecting beyond notch 30 away from pipe 4 so as to positively preclude any withdrawal of wedge-shaped end portion 36 from notch 30 through the action of vibrations, inadvertent blows, and the like.

It is obvious that clamp 2 requires no specialized equipment and no high degree of skill or manual dexterity to install. In fact, after clamp 2 is fastened to the supporting structure 6 by rivets 44, 46, or any other suitable means, it is only necessary to slip pipe 4 through aperture 28 and thereafter strike tail 32 with a hammer at point 48. Wedge-shaped end portion 36 frictionally engages the cylindrical walls of pipe 4 and prevents the same from sliding on cradle 18. No bolts and nuts are employed which can work loose in the presence of vibration during use and one need not worry about misplacing a multitude of small component parts. By bending or prying the extreme end portion of wedge-shaped end section 36 away from pipe 4 it is possible to obtain an additional safeguard against unintended removal.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A clamp for holding an elongated member such as a pipe to a supporting structure; said clamp comprising a pipe-receiving portion having an aperture adapted to slidably receive the elongated member, a cradle projecting from and mounted rigidly with respect to the pipe-receiving portion, the cradle having a depressed surface located in alignment with the aperture and substantially parallel to the center axis of the aperture, and a tail portion attached to the pipe-receiving portion and extending laterally therefrom in outwardly spaced relation to the cradle, the tail portion being looped toward the cradle and under itself in the formation of a striking surface and a wedge-shaped end portion, the striking surface being located in outwardly spaced relation to the pipe-receiving portion and at an angle with respect to the wedge-shaped end portion, the wedge-shaped end portion being located in outwardly spaced substantially parallel relation to the depressed surface of the cradle and projecting into the aperture of the pipe-receiving portion adjacent the margin thereof so that when a force of a magnitude sufficient to deform the tail portion is applied to the striking surface the wedge-shaped end portion will engage the margin of the aperture and be cammed toward the depressed surface of the cradle as it moves partially through the aperture, whereby to force the elongated member tightly against the cradle.

2. A clamp according to claim 1 in which the wedge-shaped end portion is of sufficient length to project beyond the opposite side of the pipe-receiving portion when it is driven through the aperture therein, and is sufficiently malleable to be deformed outwardly away from the cradle and toward the opposite side of the pipe-receiving portion so as to prevent unauthorized withdrawal of the wedge-shaped end portion from the aperture.

3. A clamp according to claim 1 in which the tail portion is formed integral with the pipe-receiving portion.

4. A clamp according to claim 3 and further characterized by a base integrally formed on the pipe-receiving portion opposite the tail portion, the cradle being mounted on the base.

5. A clamp according to claim 1 wherein the section of the tail portion having the striking surface is initially presented at an acute angle with respect to the center axis of the aperture so that when the wedge-shaped end portion is driven further into the aperture the angle between the section having the striking surface and the center axis will increase, thereby urging the end of the wedge-shaped end portion located adjacent to the striking surface against the elongated member.

6. A clamp according to claim 1 in which the pipe-receiving portion is provided with a notch extending outwardly from the aperture for reception of the wedge-shaped member.

7. A clamp according to claim 6 in which the notch is located along the periphery of the aperture opposite that portion of the aperture's periphery adjacent the contoured surface of the cradle so that the wedge-shaped member when driven into the notch will force the elongated member into snug frictional engagement with the depressed surface of the cradle.

8. A clamp according to claim 1 in which the pipe-receiving portion is plate-like and is presented perpendicularly to the contoured surface of the cradle.

References Cited

UNITED STATES PATENTS

| | | | |
|---|---|---|---|
| 1,642,243 | 9/1927 | Hinzer | 24—136 |
| 2,454,064 | 11/1948 | Johnson | 248—74 |
| 2,768,363 | 10/1956 | Haynes | 24—123 |
| 2,915,268 | 12/1959 | Wrobel | 248—74 |
| 3,103,343 | 9/1963 | Benchley | 24—126 X |
| 3,188,030 | 6/1965 | Fischer | 248—68 |

ROY D. FRAZIER, *Primary Examiner.*

R. P. SEITTER, *Assistant Examiner.*